Jan. 31, 1950 F. S. STERNAD ET AL 2,496,137
TIRE BUILDING MACHINE
Filed June 18, 1947 2 Sheets-Sheet 1
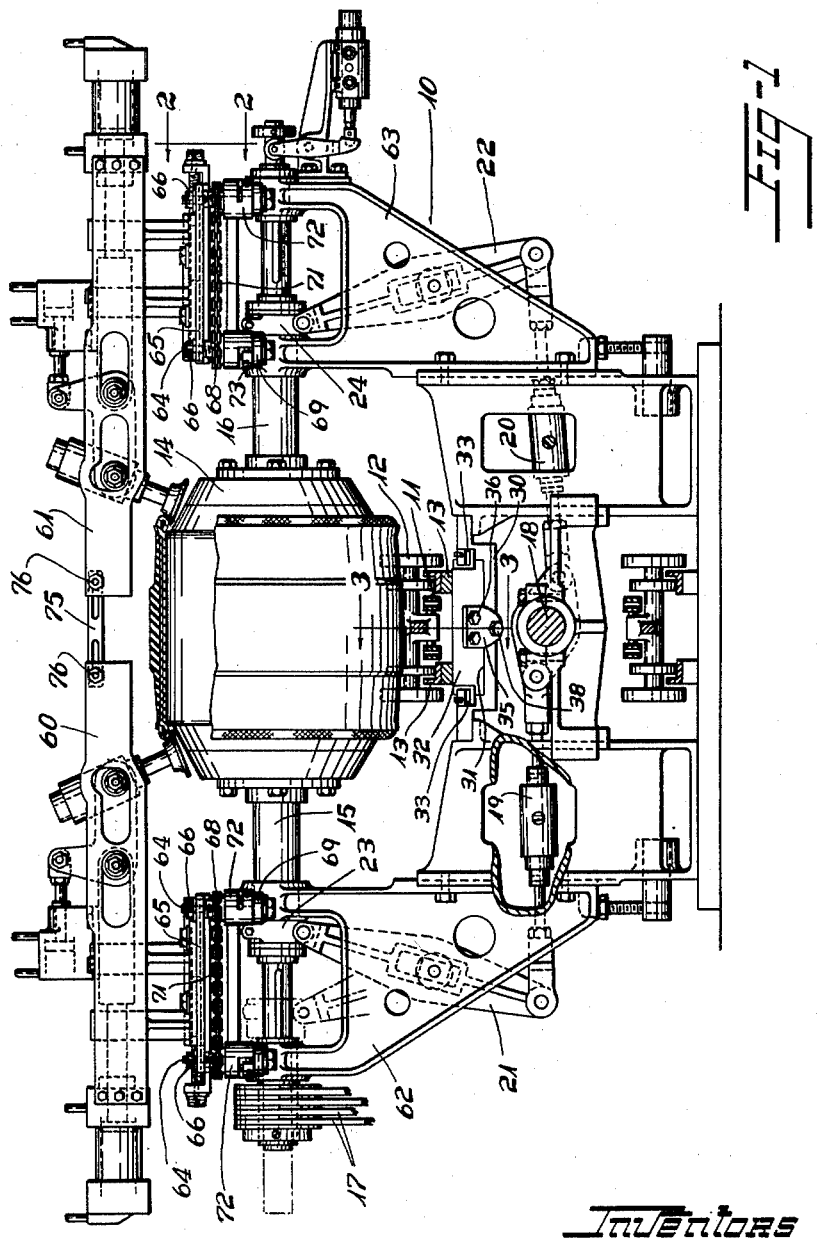
Inventors
Frank S. Sternad
John P. Sapp
By
Atty.

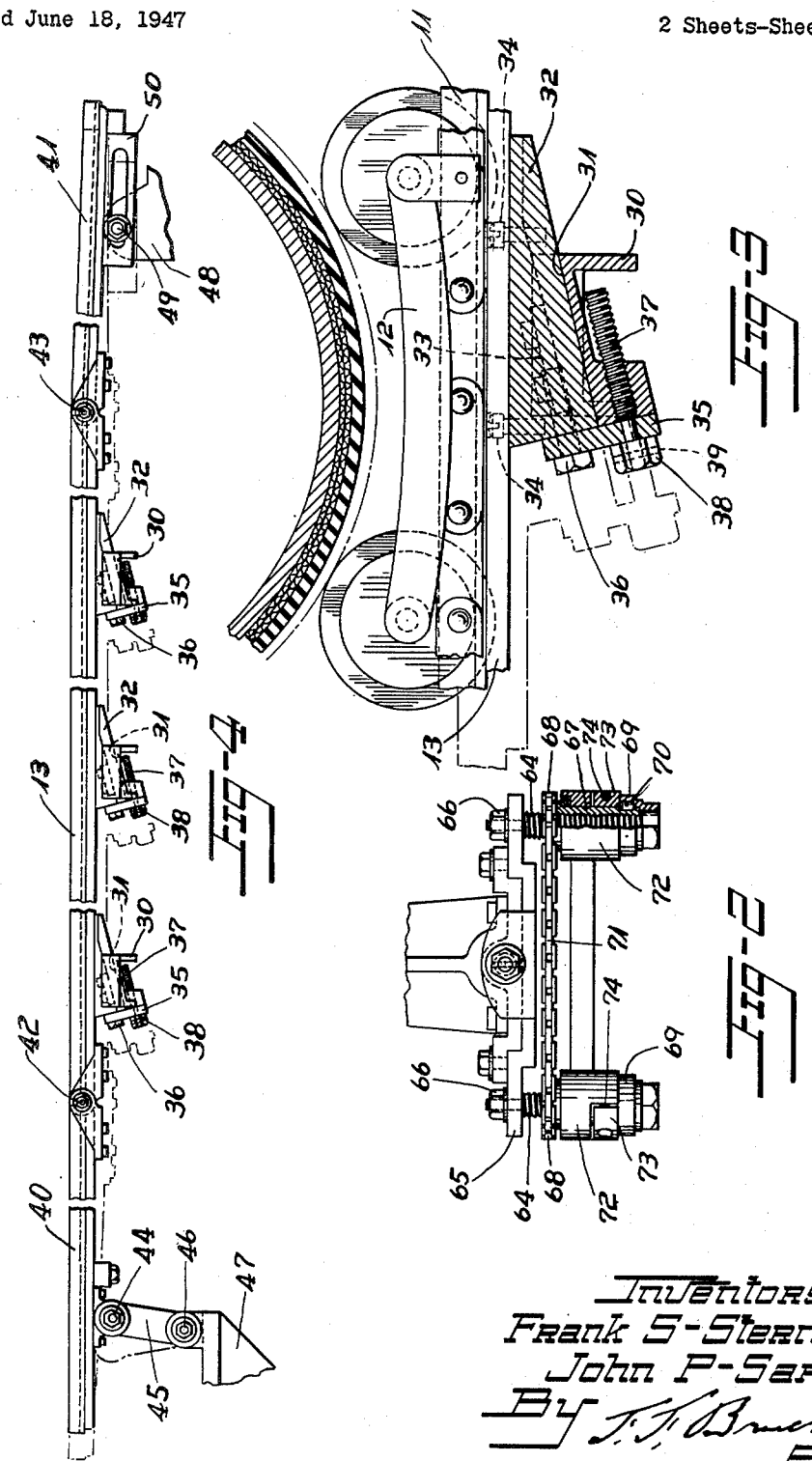

Patented Jan. 31, 1950

2,496,137

UNITED STATES PATENT OFFICE 2,496,137

TIRE BUILDING MACHINE

Frank S. Sternad, Cuyahoga Falls, and John P. Sapp, Kent, Ohio, assignors to The B. F. Goodrich Company, New York, N. Y., a corporation of New York Application June 18, 1947, Serial No. 755,382

6 Claims. (Cl. 154—9)

This invention relates to tire building machines and is useful especially in machines in which tire building drums are moved in succession from one building station to another, as in the machine of our Patent No. 2,319,643.

It is an object of the invention to provide conveniently for adjustment of the tire building apparatus to the building of tires of different sizes.

Another object is to provide for simultaneous adjustment of the conveyor throughout its length in a single operation.

A still further object is to provide for adjustment of the stitching mechanism to tires of different constructions or sizes or both.

These and other objects will appear from the following description and the accompanying drawings.

Of the drawings,

Fig. 1 is a cross sectional view of the drum conveyor showing a tire stitching unit in elevation.

Fig. 2 is a detail elevation, partly in section, taken on line 2—2 of Fig. 1, parts being broken away.

Fig. 3 is a detail sectional view taken on line 3—3 of Fig. 1, parts being broken away.

Fig. 4 is a side elevation of the conveyor guide rails, parts being broken away.

Referring to the drawings, a tire building machine for which the invention is especially suited may comprise a series of tire building units, of which the stitching unit 10 of Fig. 1 may constitute one such unit. A chain conveyor 11 is adapted to propel carriages 12 along guide rails 13 past a series of the building units in step by step movements. The carriages 12 each of which is adapted to support removably one of a series of tire building drums such as the drum 14. At each building unit a pair of opposed spindles provided, such as the spindles 15, 16, and these have axial movement for chucking the drum at the unit. One of the spindles, 15, is adapted to be driven, as by belts 17 to rotate the drum. The spindles are moved toward and from each other by a rock shaft 18, connecting rods 19, 20 and levers 21, 22 engaging shifting collars 23, 24 as more fully explained in U. S. Pat. No. 2,319,643, as lifting of the drum from the conveyor depends upon the conical shape of the chucks on the spindles 15, 16 and is only sufficient to cause the drums to clear the conveyor carriages 12.

It is desirable to provide for quick adjustment of the apparatus to accommodate drums of different diameters for building tires of correspondingly different diameters. For this purpose, in accordance with this invention we provide for vertical adjustment of the guide rails 13 supporting the upper reach of the conveyor simultaneously throughout their extent while the spindle elevations are fixed. To the attainment of this purpose in an expeditious manner, each cross frame member 30 of the tire building units is formed with a machined upper surface 31 inclined to a horizontal plane upwardly in the direction of travel of the conveyor. Wedge-shaped blocks 32 are slideably mounted on these inclined surfaces and are held in contact therewith by gibs 33 engaging over margins of the blocks. The blocks 32 are all fixed to the guide rails 13 at intervals therealong, as by screws 34. At least some of the wedge blocks 32 are provided with plates 35 secured thereto by screws 36. Each plate 35 has an adjusting screw 37 journaled therethrough and having threaded engagement with the cross-frame member 30 supporting it, the journaled portion of the screw being reduced in diameter. A polygonal head 38 is secured to the screw by a pin 39 and retains the plate 35 between the threaded body of the screw and the head. The arrangement is such that by turning the screw, as by means of a wrench engaging the head 38, the wedge 32 and with it the rails 13 are moved in a direction longitudinal of the rails and the rails are raised or lowered as desired. As the wedge blocks 32 are all fixed to the rails, it is only necessary to equip one of the wedge blocks with an adjusting screw to raise the rails throughout their extent, thereby providing for quick adjustment by a single movement. However, where the rails are long and relatively flexible, it is desirable to adjust the rails by tensioning the rails rather than by attempting to push them. Consequently it is advisable to provide at least two of the wedges, one at each end of the rails, with adjusting screws. The arrangement is such that one end adjustment may be backed off while the adjustment at the opposite end is employed to make the new adjustment in a direction which tensions the rails and thereby prevents buckling of the rails.

To permit vertical movement of the rails 13 throughout their extent along the building stations without disturbing their elevation substantially at their loading and unloading ends, extension rails 40, 41 in continuation thereof are hinged thereto at their ends by hinges 42, 43. Extension rails 40 are hinged, as at 44 to a link 45 which is in turn hinged, as at 46 to the stationary support 47. The extension 41 may be similarly supported as by a stationary bracket 48 having a cross pin 49 hingedly engaging a slotted ear 50 fixed to the extension.

Further in accordance with this invention, provision is made for adjusting the tool heads 60, 61 vertically to accommodate drums of different sizes while maintaining their stable relation to the other parts of the machine. Each head is supported from the frame 62 or 63 of the unit by a plurality of adjusting screws 64. These screws, preferably four of them, are fixed to a plate 65, as by nuts 66. Internally threaded sleeves 67 engage the threads of the screws and are rotatably mounted in vertical bores of the frame 62 or 63. The sleeves have integral sprockets 68 at their upper extremities and are engaged at their lower ends by collars 69 keyed thereto, as at 70. A chain 71 engages and encompasses all the sprockets so that the sleeves may be turned in unison to raise and lower the plate 65 and with it the head 60 or 61 secured thereto. The bosses 72 surrounding the sleeve 67 are preferably provided with split portions 73 having clamping adjustment upon the sleeves by virtue of adjusting screws 74 whereby the sleeves may be locked in adjustment if desired. A tie bar 75 connecting the heads 60, 61 may be released by loosening screws 76 during individual adjustment of the heads 60, 61 and secured thereto after adjustment is complete. The heads 60, 61 are slideably mounted on plates 65 and have adjustment therealong axially of the spindles for adjustment to drums of different widths.

The operation of the adjusting features is believed to be clear from the foregoing detailed description thereof. The general operation of building tires is the same as that described in our aforementioned patent.

Variations may be made without departing from the scope of the invention as it is defined by the following claims.

We claim:

1. Apparatus for building tires, said apparatus comprising a series of chucking means each having opposed chucking spindles, a conveyor for carrying tire-building drums along the apparatus to and from said spindles, means for guiding a reach of said conveyor with relation to the axes of said spindles, and means for adjusting the elevation of the guiding means and with it the said reach of the conveyor with relation to the elevation of said spindles, said adjusting means comprising adjustable members along said conveyor, and means for adjusting said members in unison.

2. Apparatus for building tires, said apparatus comprising a series of chucking means each having opposed chucking spindles, a conveyor for carrying tire-building drums along the apparatus to and from said spindles, means for guiding a reach of said conveyor, and means for adjusting the elevation of the guiding means and with it the said reach of the conveyor with relation to the elevation of said spindles, said adjusting means comprising adjustable wedges along said conveyor, and means for adjusting said wedges in unison.

3. Apparatus for building tires, said apparatus comprising a series of chucking stations each having opposed chucking spindles, a conveyor for carrying drums along the apparatus from station to station, means for guiding a reach of said conveyor past said stations, and means for simultaneously adjusting the elevation of the guiding means with relation to the elevation of said spindles, said adjusting means comprising inclined surfaces at a plurality of said stations, wedge members engaging said surfaces and attached to said guiding means, and means for moving said guiding means longitudinally to move said wedges with relation to said inclined surfaces.

4. Apparatus for building tires, said apparatus comprising a chucking means each having opposed series of chucking spindles, a conveyor for carrying tire-building drums along the apparatus to and from said means, means for guiding a reach of said conveyor along a path past said stations, and means for adjusting the elevation of the guiding means and with it said reach of the conveyor with relation to the elevation of said spindles, said adjusting means comprising inclined surfaces at said stations along said conveyor, wedge members engaging said surfaces and attached to said guiding means, hinged extensions at each end of said guiding means, means anchoring said extensions while permitting vertical adjustment of said guiding means, and screws adjustably engaging at least some of said wedge members for simultaneously adjusting said wedge members with relation to said inclined surfaces.

5. Apparatus for building tires, said apparatus comprising a series of building stations, conveyor means for moving a tire building drum along the apparatus to and from said stations, chucking means at said stations having opposed chucking spindles, means for moving said spindles to lift a drum from said conveyor means, to chuck the same for rotation, guiding means for said conveyor means, a tool mounted for engagement with said drum, means for simultaneously adjusting the elevation of said guiding means with relation to all said spindles, and means for adjusting the elevation of said tool with relation to said spindles at a station, said adjusting means for said guiding means and said tool providing for accommodation of drums of different diameters.

6. Apparatus for building tires, said apparatus comprising a plurality of chucking means each having opposed chucking spindles, a conveyor for carrying tire-building drums along the apparatus to and from said spindles, means for guiding a reach of said conveyor with relation to the axes of said spindles, said guiding means having adjustable supports at said chucking means, and an adjusting member for moving said guiding means lengthwise along said supports for changing the elevation of said guiding means with relation to the elevation of said spindles.

FRANK S. STERNAD.
JOHN P. SAPP.

REFERENCES CITED

The following references are of record in the file of this patent:

UNITED STATES PATENTS

| Number | Name | Date |
| --- | --- | --- |
| 1,090,231 | Richard | Mar. 17, 1914 |
| 1,234,363 | Mahoney | July 24, 1917 |
| 2,319,643 | Sternad et al. | May 18, 1943 |